Figure 1:
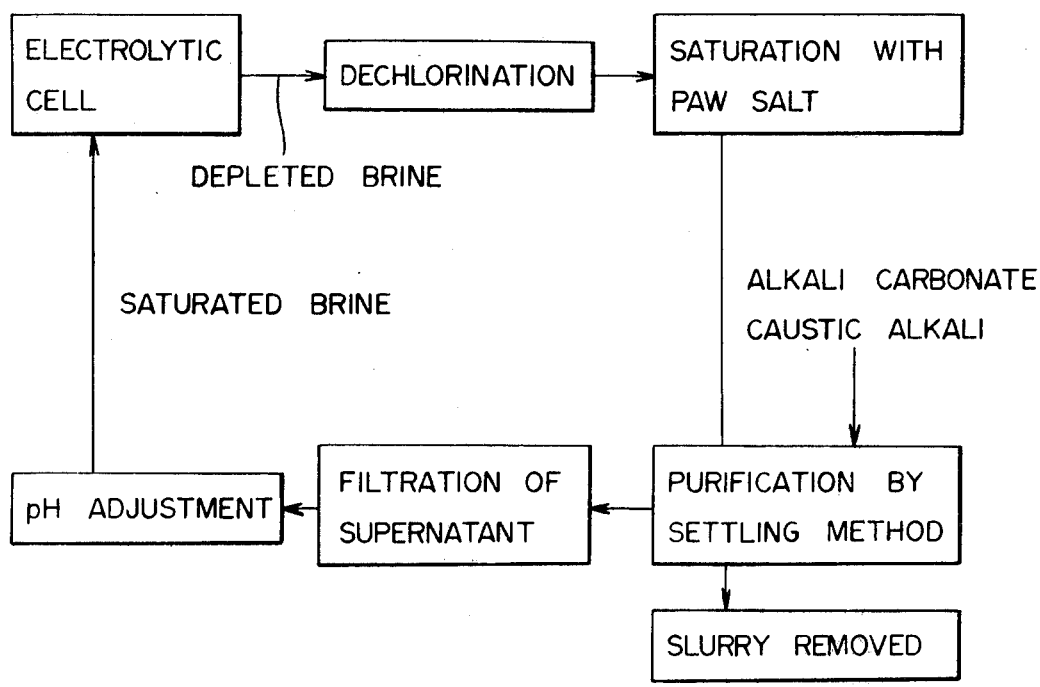

United States Patent [19]

Yokota et al.

[11] 4,119,508
[45] * Oct. 10, 1978

[54] METHOD OF PURIFYING THE RAW BRINE USED IN ALKALI SALT ELECTROLYSIS

[75] Inventors: Noriyuki Yokota, Ashiya; Shingo Tokuda, Nishinomiya; Yoshiro Ito; Kenji Itaya, both of Amagasaki, all of Japan

[73] Assignee: Osaka Soda Co. Ltd., Osaka, Japan

[*] Notice: The portion of the term of this patent subsequent to Nov. 29, 1994, has been disclaimed.

[21] Appl. No.: 805,160

[22] Filed: Jun. 9, 1977

Related U.S. Application Data

[60] Division of Ser. No. 639,409, Dec. 10, 1975, Pat. No. 4,060,465, which is a continuation of Ser. No. 482,496, Jun. 24, 1974, abandoned.

[51] Int. Cl.² ............................ C25B 1/00; C25B 1/26
[52] U.S. Cl. .................................... 204/128; 204/99; 210/26; 210/27; 210/36; 210/38 A
[58] Field of Search ........................ 204/99, 125, 128; 210/26, 27, 34, 36, 38 A; 423/157

[56] References Cited

U.S. PATENT DOCUMENTS

| 2,340,110 | 1/1944 | D'Alelio | 210/38 |
| 3,551,309 | 12/1970 | Dunn et al. | 204/99 |
| 3,755,161 | 8/1973 | Yokota et al. | 210/36 |
| 3,816,356 | 6/1974 | Grannen et al. | 210/38 |
| 4,060,465 | 11/1977 | Yokota et al. | 204/128 |

OTHER PUBLICATIONS

Fradkin et al., "Removing the Hardness from Brackish Waters," Chem. Abs. 72:6167t, 1970.

Primary Examiner—Charles N. Hart
Assistant Examiner—Ivars Cintins
Attorney, Agent, or Firm—Sherman & Shalloway

[57] ABSTRACT

A method of purifying the raw brine used in the elecrolysis of the aqueous NaCl or KCl solution by removing the Mg and Ca ions from said brine, which comprises contacting said brine with a member selected from the group consisting of
(a) the chelate-forming water-insoluble resins capable of forming an intramolecular complex with the Mg and Ca ions, said resins being selected from the class consisting of the styrene-butadiene copolymer resins containing the group $>N-CH_2COOH$, the epichlorohydrin polymer resins containing the group $>N-CH_2COOH$, the N-phenyl glycine-glycidyl methacrylate copolymer resins containing the group $>N-CH_2COCH$ and the styrene-divinylbenzene copolymer resins containing the group $>N-CH_2COOH$; and
(b) the water-insoluble adsorbent solids adsorptively supporting a chelate-forming compound selected from the group consisting of the aminoacetic acids containing at least one $>N-CH_2COOH$ in their molecular structure and the oligomers and the alkali metal salts thereof.

8 Claims, 2 Drawing Figures

METHOD OF PURIFYING THE RAW BRINE USED IN ALKALI SALT ELECTROLYSIS

This is a division of application Ser. No. 639,409, filed Dec. 10, 1975, now U.S. Pat. No. 4,060,465 which in turn is a continuation of application Ser. No. 482,496, filed June 24, 1974, now abandoned.

This invention relates to a method of purifying the raw brine that is used in alkali salt electrolysis, the method being one in which the raw brine used in the electrolysis of the aqueous NaCl or KCl solution can be purified by the removal therefrom of the Mg and Ca ions with improved purification effects as well as great advantages from the standpoint of operations and equipment required. More particularly, the invention relates to a method wherein in purifying the raw brine used in the electrolysis of the aqueous NaCl or KCl solution by removing the Mg and Ca ions, the foregoing raw brine is contacted with a member selected from the group consisting of (a) the chelate-forming water-insoluble resins capable of forming an intramolecular complex with the Mg and Ca ions, which resins are selected from the class consisting of the styrene-butadiene copolymer resins containing the group $>$ N—$CH_2COOH$, the epichlorohydrin polymer resins containing the group $>$ N—$CH_2COOH$, the N-phenylglycine-glycidyl methacrylate copolymer resins containing the group $>$ N—$CH_2COOH$ and the styrene-divinylbenzene copolymer resins containing the group $>$ N—CH COOH; and (b) the water-insoluble adsorbent solids adsorptively supporting a chelate-forming compound selected from the group consisting of the aminoacetic acid derivatives containing at least one $>$ N—$CH_2COOH$ in their molecular structure, the oligomers thereof and the alkali metal salts thereof.

As the method of purifying the brine used in the electrolysis of alkali salts, hitherto the method used was that in which the impurities were precipitated and removed with the use of a purification agent. That is, the magnesium and calcium components that are contained in great quantities in the raw salt are precipitated and removed in the form of magnesium hydroxide and calcium carbonate with an alkalizing agent. Further, in removing the trace amount of heavy metals contained, for example, an operation of removing these metals by coprecipitation with iron chloride is being practiced. However, in the case of the foregoing method, not only the settling speed of the resulting precipitate is slow but also in most cases the properties of the precipitate make for difficulty in its filtration. Hence, the usual practice is to separate the supernatant brine. In consequence, in most cases the possibility of the admixture in the supernatant brine of the precipitate is inevitable, and moreover the filtration of this precipitates is exceedingly difficult. Thus, the forgoing method cannot be regarded as being satisfactory when considered from the standpoint of commercial operations.

The continuous purification method that is presently being utilized commercially is that in which the unpurified brine is introduced to a settling tank while adding an alkalizing agent thereto and thereafter withdrawing the supernatant brine continuously. However, in this method a convective phenomenon is set up in the settling tank due to changes in the temperature of the outside air or to a slight difference in the specific gravity of the brine, with the consequence that it frequently happens that the precipitate becomes admixed in the supernatant brine. Thus, there is the necessity of removing the impurities by further passing the supernatent brine through a sand filter layer. Again, since the settling speed of the resulting precipitate is slow, the speed of the rising brine in the settling tank must be limited to not more than about 1.0 meter per hour. In consequence, the total amount of the circulating brine dwelling in the system becomes tremendously great, with the consequence that there arises the necessity for a settling tank, filteration tank, alkali purifing agent tank and other attendant facilities, all of which are of large capacity. Especially, in the case the purification is carried out by the settling method such as described, the magnesium component, which has an adverse effect in carrying out the mercury type electrolysis cell, is not fully removed. Since the content of the magnesium component in the brine introduced to the electrolytic cell cannot be reduced to less than several milligrams per liter, this becomes the principal reason that the electric current efficiency cannot be raised to above 94-95%. In any event, the present purification method possess numerous drawbacks in respect of the equipment required and operations as well as the degree of purification attained. These drawbacks were in need of solution in the presently practiced method.

In consequence of our researches with a view to surmounting these various deficiencies of the prior art method and thereby provide a method which can purify the raw brine used in the alkali salt electrolysis with excellent purification effects an well as with great advantage from the standpoint of operations and equipment required, we found that the foregoing various drawbacks and disadvantages of the prior art method could be overcome at once by a procedure which consists of contacting the aforesaid raw-brine with a member selected from the group consisting of the chelate-forming water-insoluble resins capable of forming an intramolecular complex with the aforesaid Mg and Ca ions and the water-insoluble adsorbent solids adsorptively supporting the aforesaid chelate-forming compounds.

It is therefore an object of this invention to provide an improved method of purifying the raw brine used in alkali salt electrolysis, which method makes it possible to remove the Mg and Ca ions from the raw brine with a simple operation and an advantageous apparatus and with a high degree of purification effects and moreover without the accompaniment of the various drawbacks and disadvantages of the foregoing conventional method.

Other objects and advantages of the present invention will become apparent from the following description.

The resins used in the present invention are the chelate-forming water-insoluble resins capable of forming an intramolecular complex with the Mg and Ca ions, which resins are selected from the group consisting of the sytrene-butadiene copolymer resins containing the group $>$ N—$CH_2COOH$, the epichlorohydrin polymer resins containing the group $>$ N—$CH_2COOH$, the N-phenylglycine-glycidyl methacrylate copolymer resins containing the group $>$ N—$CH_2COOH$ and the styrene-divinylbenzene copolymer resins containing the group $>$ N—$CH_2COOH$. Of these resins, especially to be preferred are the styrene-butadiene copolymer resins containing the group $>$ N—$CH_2COOH$, the epichlorohydrin polymer resins containing the group $>$ N—$CH_2COOH$ and the N-phenylglycine-glycidyl methacrylate copolymer resins containing the group > N—CH$_2$COOH.

These resins can be prepared, say, in the following manner.

(1) The resin consisting of the styrene-butadiene copolymer containing the group > N—CH$_2$COOH.

a. A sytrene-butadiene copolymer is vulcanized with sulfur monochloride and then granulated. These granules are chloromethylated in the copresence of chlorodimethyl ether, tetrachloroethylene and zinc chloride. The chloromethylated granules are then reacted in a dimethylformamide solution containing iminodiacetic acid and sodium hydroxide, whereby a granular resin containing the iminodiacetic acid group of the following formula can be synthesized.

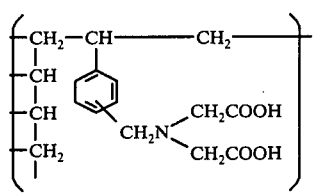

b. A sytrene-butadiene copolymer is nitrated with nitric acid and sulfuric acid and thereafter reduced with stannous chloride and hydrochloric acid. The resulting reaction product in then reacted with a weakly alkaline solution containing monochloroacetic acid to obtain a polymer having the following structure.

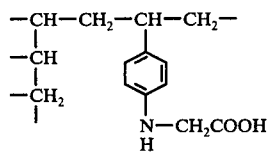

(2) The epichlorohydrin polymer resin containing the group > N—CH$_2$COOH.

An epichlorohydrin polymer of a molecular weight of 600,000–700,000 polymerized by using as catalyst a reaction product of dibutyl tin oxide and butyl phosphate is reacted in chloroform containing hexamine, following which the reaction product is washed in a mixture of concentrated hydrochloric acid and ethanol and water-washed thereafter. This polymer is further reacted in an aqueous solution containing sodium monochloroacetic and ethanol while maintaining the system in a weakly alkaline state with an alkali hydroxide, whereby a resin containing the group > N—CH$_2$COOH of the following structure can be synthesized.

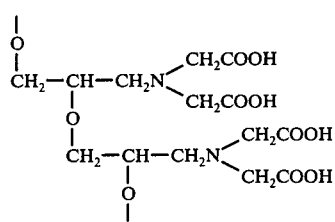

(3) The N-phenylglycine-glycidyl methacrylate copolymer resin containing the group > N—CH$_3$COOH.

a. A reaction product of N-phenylglycine and glycidyl methacrylate is purified with ethyl ether and thereafter dissolved in ethanol. Benzoyl peroxide in then added and the mixture is reacted to obtain a polymer having the following structure.

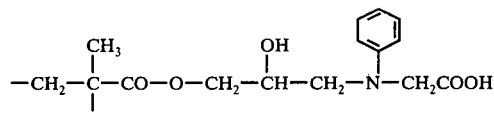

b. A reaction product of N-phenylglycine and glycidyl methacrylate is dissolved in acetone along with methacrylic acid. Benzoyl peroxide is then added and the mixture is reacted to obtain a polymer having the following structure.

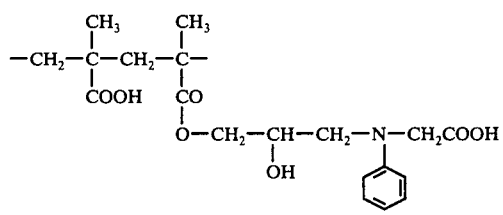

(4) The styrene-divinylbenzene copolymer containing the group > N—CH$_2$COOH.

a. A mixture consisting of monomeric styrene, divinylbenzene, t-amyl alcohol are benzoyl peroxide is reacted in an aqueous solution containing sodium chloride and an ammonium salt of a styrene-maleic anhydride copolymer to obtain a granular polymer.

This granular polymer is reacted in a combined solution of chloromethylmethyl ether and tetrachloroethylene using as catalyst zinc chloride, after which the reaction product is washed in hydrochloric acid and acetone to obtain a chloromethylated granular polymer.

This chloromethylated granular polymer is allowed to stand in pyridine. Iminodiacetonitrile synthesized in advance from hexamine and formalin is then added to the foregoing polymer, and the mixture is reacted followed by washing the reaction product in dilute hydrochloric acid and water. This is followed by adding concentrate hydrochloric acid and refluxing to obtain a styrene-divinylbenzene copolymer containing the group > N—CH$_2$COOH of the following structure.

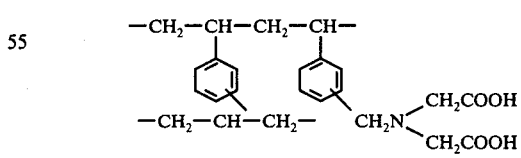

b. A styrene-divinylbenzene copolymer is nitrated with nitric acid and sulfuric acid, after which the product is reduced with stannous chloride and hydrochloric acid. The resulting reaction product is then reacted in a weakly alkaline solution containing monochloroacetic acid to obtain a polymer having the following structure.

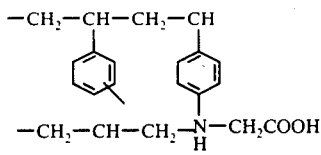

The water-insoluble adsorbent solid carrier adsorptively supporting a chelate-forming compound to be used in the present invention can be obtained by adsorptively supporting on said adsorbent solid either an aminoacetic acid derivative, its oligomer or the alkali metal salts thereof containing at least one $>$N—CH$_2$COOH. As examples of these carriers, mention can be made of such carbon type adsorbents as active carbon and coals, the silica-alumina type adsorbents as silica gel and zeolite, the organic synthetic high polymer adsorbents.

The deposition of the chelate-forming compound on the inorganic carrier can be accomplished by a procedure consisting of dissolving the foregoing compound in a weakly alkaline solvent, or in an organic solvent when an oligomer of said compound is used, and thereafter effecting the adsorption onto the carrier by causing the resulting solution to flow down contactingly over the carrier or by bringing the carrier and solution into contact with stirring. The amount adsorbed of the chelate-forming compound by the carrier ranges from about 2–20% by weight. Usually, 10% by weight is sufficient.

As specific examples of the aforesaid weakly alkaline solvent used for dissolving the chelate-forming compound, mention can be made of the aqueous caustic soda solution, aqueous caustic potash solution and aqueous ammonia solution, of the order of 0.5–5% by weight concentration. On the other hand, as the organic solvent for the oligomers, included are toluene, xylene, etc. The chelate-forming compounds are exemplified as follows: iminodiacetic acid

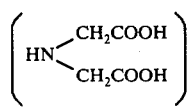

and the alkali metal salts thereof; nitrilotriacetic acid

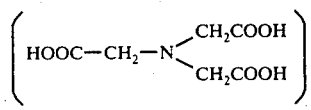

and the alkali metal salts thereof; N-hydroxyethyliminodiacetic acid

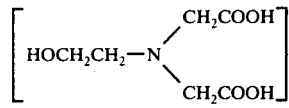

and the alkali metal salts thereof; diethylenetriaminopentaacetic acid

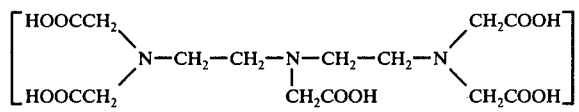

and the alkali metal salts thereof; 1,2-cyclohexanediaminetetraacetic acid

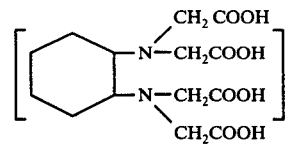

and the alkali metal salts thereof; trimethylenediaminetetraacetic acid

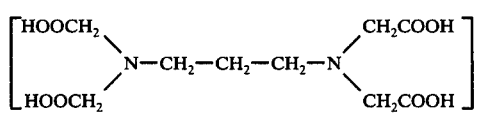

and the alkali metal salts thereof; ethylene glycol diethyl ether diamine tetraacetic acid

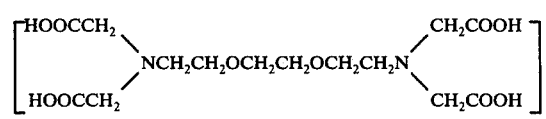

and the alkali metal salts thereof; beta-aminoethylphosphonic-N,N-diacetic acid

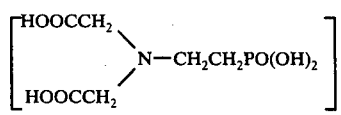

and the alkali metal salts thereof; ethylenediaminetetraacetic acid

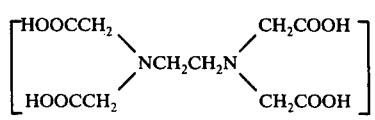

and the alkali metal salts thereof; triethylenetetraminehexaacetic acid

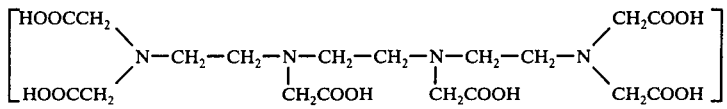

and the alkali metal salts thereof; aminomethylphosphonic-N,N-diacetic acid

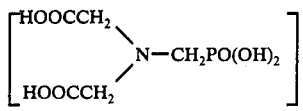

and the alkali metal salts thereof; iminodiacetic acid propylene oxide

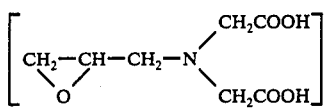

and the alkali metal salts thereof; and iminodiacetic acid propylene oxide oligomer

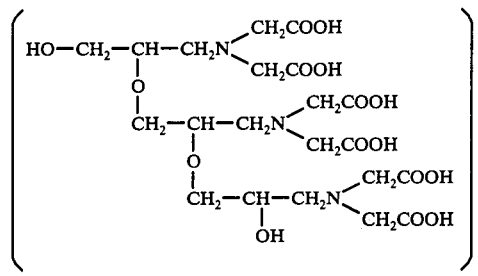

and the alkali metal salts thereof. As the foregoing alkali OH metal salts, the salts of Na and K can be mentioned.

In the invention method, the use of an adsorbent solid on which has been adsorptively supported a chelate-forming compound, as above described, is much more desirable than the use of the resins. The advantages that are had by the use of the adsorbent solid instead of the resins are as follows:

(1) The preparation of the adsorbent solid is exceedingly simple, since it consists in merely causing the adsorption by the adsorbent carrier of the chemical containing the group $>$N—CH$_2$COOH. Hence, this adsorbent solid can be prepared at low cost.

(2) It is an easy matter to increase the surface area of the adsorbent carrier. Hence, since the chemical can be adsorbed without impairment of the carrier, the reaction speed can be enhanced in view of the properties inherently possessed by the adsorbent.

(3) Since the physical configuration of the carrier can be optionally chosen, in practicing the method a wide range of equipment can be employed for the treatment. For instance, the size of the packed layer and its height can be optionally chosen. In addition, since an optional choice of the specific gravity of the carrier can be made, it becomes possible to adopt a fluidized bed type of process.

(4) The mechanical strength of the adsorbent solid is great, and it possesses great resistance to attrition.

(5) It is exceedingly stable chemically, it being resistant to acids and alkalis.

While the above-described chelate-forming water-insoluble resin (a) capable forming an intramolecular complex with the Mg and Ca ions and the water-insoluble adsorbent solid (b) adsorptively supporting a chelate-forming compound are imposed no particular restrictions as to their particle size, preferred are those having a particle size on the order of about 10–60 mesh.

According to the invention method, the raw brine can be contactingly passed through a packed bed packed with a treating agent selected from the foregoing (a) and (b). As indicated hereinabove, it is also possible, if desired, to carry out the treatment by passing the raw brine through a packed bed formed into a fluidized bed instead of a fixed packed bed. In the case of the fixed packed method in which, say, a column is packed with either the aforesaid chelate-forming water-insoluble resin (a) or the adsorbent solid (b) adsorptively supporting a chelate-forming compound, the raw brine fed from the neighborhood of the top of the column is preferably caused to flow down through the packed bed at a space velocity of not more than 20 nr$^{-1}$. Usually, a space velocity ranging between about 2 hr$^{-1}$ and about 20 hr$^{-1}$ can be suitably chosen. Again, the pH of the raw brine is preferably one ranging from about 3 to about 10.

The process of the invention method will now be described by reference to the accompanying drawings.

FIG. 1 is a flow sheet diagram of a mercury cell process of the conventional method. In this case the depleted brine discharged from the electrolytic cell, after having been dechlorinated, is conveyed to the alkali salt saturation tank, where the raw salt is dissolved therein to saturation. This is followed by adding a caustic alkali and an alkali carbonate to precipitate the magnesium and calcium components contained in the raw salt as magnesium hydroxide and calcium carbonate, after which the slurry thereof is separated and discarded, while the supernatant brine, after being submitted to a further step of filtration, is neutralized with hydrochloric acid to adjust its pH and thereafter recycled to the electrolytic cell.

Figure 2:
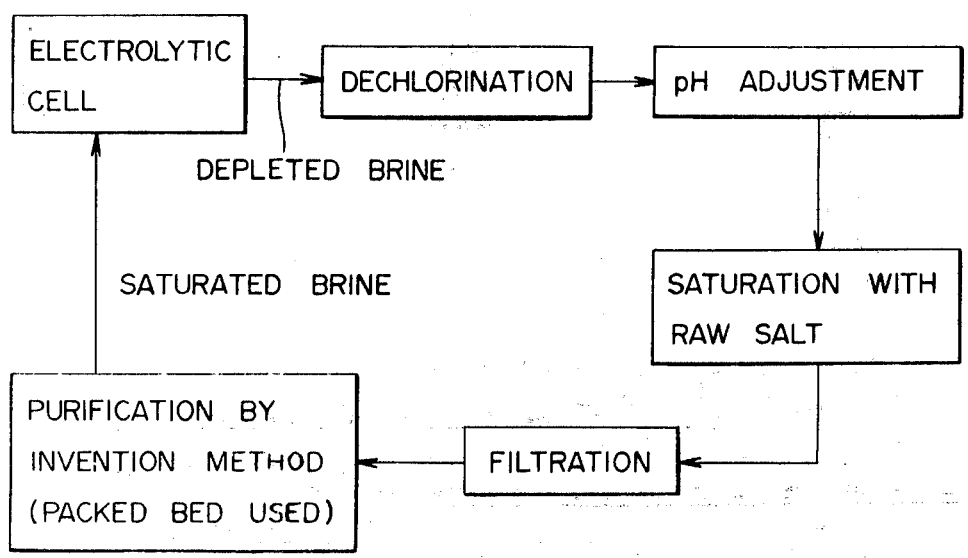

FIG. 2 is a flow sheet diagram of the invention method. In this case the depleted brine discharged from the electrolytic cell, after dechlorination, is adjusted of its pH, if necessary, after which the raw salt is dissolved therein to saturation followed by passing the saturated solution through a packed bed containing the aforesaid chelate-forming water-insoluble resin or the adsorbent solid supporting a chelate-forming compound. In those cases where there is an admixture of a small amount of contaminating materials such as dirt and sand that have entered along with the raw salt, a simple filtration step is interposed. In consequence of the brine having been contacted with this packed layer, the magnesium and calcium components are removed until only a trace thereof remain. Hence, the brine can be recycled as such to the electrolytic cell as purified brine.

The aforesaid resins (a) and adsorbent solids (b) used in the invention method are far superior to the conventional ion-exchange resins in their capacity to adsorb calcium and magnesium. Further, their activity does not decline even when they are used for long periods of time. Again, the regeneration of the foregoing resin (a) is also accomplished by a simple procedure. A mineral acid solution is passed through the packed bed after its use, and the impurities are eluted and thereafter the packed bed is further washed with a weakly alkaline solution, thus regenerating the resin.

The invention method, as shown by the aforementioned flow sheet diagram, uses a packed bed for adsorptively removing the impurities instead of an alkalizing agent by which the impurities are removed by precipitation. In consequence, such equipment as the settling tank and the alkali purifing agent tank, and the various steps including the operation of recovering the salt component from the precipitate, etc., can be dispensed with.

In concomitance with the enlargement of the capacity of the alkali salt electrolysis cell and the employment of a higher current density, the equipment required for the treatment of the brine naturally becomes of larger capacity, and especially in the case of a method such as the mercury cell of electrolysis wherein a trace amount of impurities sensitively affect the electrolytic cell, the tolerance for impurities becomes still more strict as the current density becomes higher. Hence, it is apparent that there is a limit to the degree of improvements that can be made in the physical or mechanical settling and filtration operations of the conventional method.

Accordingly, the first feature of the invention method is that great effects have been achieved in that a tremendous reduction has been accomplished in the brine equipment required by carrying out the adsorptive removal of the brine impurities by means of a chemical reaction. Further, in view of the fact, as hereinbefore indicated, that the settling speed of the settling impurities was slow in the conventional method, the amount of circulating brine dwelling in the system was exceedingly great. However, since in accordance with the invention method the brine is only flowed down through the packed layer, the amount of brine dwelling substantially in the system can be reduced to about one-tenth that of the conventional method. In addition, a drop in the temperature of the circulating brine is prevented by this reduction in the dwell time, with the consequence that the rise in the electrolytic voltage can checked.

A second advantage of the invention method is that as a result of having adopted a chemical adsorptive method a reduction to a further extent than in the case of the conventional method of the magnesium component, which sharply affects the electrolytic results, has been made possible.

In the conventional method the supernatant brine obtained after separation by precipitation by means of an alkalizing agent had a pH of above 10, and the magnesium contained therein was present mainly in the form of magnesium hydroxide. Now, this magnesium hydroxide did not readily become magnesium ions by neutralization of the brine by means of hydrochloric acid in the next step and was fed to the electrolytic cell in the form of basic magnesium chloride or magnesium hydroxide. When this nonionic basic magnesium chloride or magnesium hydroxide is fed to a mercury type alkali salt electrolysis cell, it is known that the electrocapillarity of the mercury cathode is impaired to result in hindering the normal electrode reaction, the discharge of the sodium or potassium ions, with the consequence that this becomes the cause of a decline in the current efficiency. In capturing the magnesium component by means of the chelating agent in accordance with the invention method, there is no need to make the brine strongly alkaline after dissolving the raw salt. Hence, since the magnesium component is contained in the form of magnesium ions, the removal of the magnesium component can be accomplished almost completely with the chelating agent, or even though there may be present a little, it does not affect the current efficiency, since it is present in the form of magnesium ions. Thus, it is possible according to the invention method to entrance the current efficiency up to as much as 96–98% in forming caustic alkalis.

A third advantage of the invention method resides in the point that the amount of the caustic alkali product actually obtained can be increased, because an alkalizing agent is not used as the purifying agent as in the conventional method. Since in the alkali salt electrolysis process using the mercury cell the decomposition of the alkali salt component is limited to only about 10–15% of that contained in the brine, and the remaining 85–90% of the alkali chloride is recycled and reused, the amount of flow of the brine is extremely great. Hence, in the conventional method it was necessary to add caustic alkalis and alkali carbonate in a great excess of the equivalent of the magnesium and calcium components for fully precipitating the magnesium hydroxide and calcium carbonate. Thus, this excess amount was wastefully consumed. Moreover, since this amount used for precipitating the magnesium component is considerably great, being 1–2% of the amount produced of the intended product caustic alkali, the actual amount of the product obtained becomes 98–99%. Further, it goes without saying that an equivalent of hydrochloric acid is required for neutralizing this excess caustic alkali. On the other hand, this type of purification agent is not required in the case of the invention method. Hence, the real amount produced can be increased by the invention method.

Other advantages of the invention method are as follows:

(1) While in the conventional method an alkali carbonate is used as one of the alkali purifing agents for removing the calcium component as calcium carbonate, the carbonic ion enters into the brine and is present in excess during the purification operation. Subsequent to the purification step, it becomes transformed into carbon dioxide in the electrolytic cell and is contained in the evolving chloride to lower the purity of the latter. Since in accordance with the invention method there is no need at all to add an alkali carbonate, there is no risk of impairment of the purity of the calorine by means of the carbon dioxide ascribable to the purifing agent.

(2) In the alkali chloride electrolysis cell in the case of the mercury process, a small amount of mercury eluted from the mercury cathode becomes contained in the depleted brine. In the case of the conventional method this mercury coprecipitates in the form of metallic mercury and other mercury compounds along with the precipitate that is formed during the purification step by means of the alkalizing agent. Hence, a complicated step for extracting and recovering the mercury components from the precipitates slurry becomes necessary. Since such a precipitate as this is not formed at all when the invention method is employed, such a treatment is not necessary.

(3) In the case of the electrolysis of alkali salts, the heavy metals, say, chromium and vanadium that are contained in very minute amounts in principally the raw salt have an exceedingly adverse effect on the electrolytic reaction especially in the case where the electrolysis is carried out by the mercury cell.

In the conventional method, when these heavy metal components were contained in the brine, they were coprecipitated with the use of principally iron chloride etc. However, the settling speed was slow in this case, and hence an extra treatment step was required. According to the invention method, since these heavy metals are also adsorbed by the chelating agent, no special equipment is required for the elimination of these heavy metals.

It is, of course, possible to use the invention method in combination with the conventional method by connecting it in series or parallel with the latter.

EXAMPLE 1

A salt-saturated raw brine (NaCl 310 g/liter, Mg 50 mg/liter, Ca 250 Mg/liter), after adjusting its pH to 5.5, was flowed down at a space velocity of 15 hr$^{-1}$ through a column of 600 mm diameter packed with 200 liters of a chelate resin with 20 – 50 mesh, which containing the iminodiacetic acid groups and epichlorohydrin polymer as the main chain. The Mg and Ca contents of the purified brine, after passage through the column, were 0.7 mg/liter and 1.2 mg/liter, respectively. When this brine was then fed to a mercury type alkali salt electrolysis cell and electrolyzed with a current density of 70 A/dm$^2$ and a temperature of 75°±2° C., the current efficiency for forming caustic soda was 98.2%.

CONTROL 1-a

The starting salt-saturated raw brine used in Example 1 was adjusted to pH = 10.4 by adding caustic soda and sodium carbonate, following which the solution was allowed to stand still to settle the resulting precipitate. The supernatant brine was then filtered. The content of Mg was 3.4 mg/liter and that of Ca was 5.8 mg/liter. After adjusting this brine to a pH = 7.2, it was electrolyzed in like manner as in Example 1, whereupon the current efficiency for forming caustic soda was 94.2%. When the caustic soda used for purifying the brine is considered, the efficiency in obtaining the caustic soda corresponds to 92.4%.

CONTROL 1-b

The brine obtained after purification in Control 1-a was further added with caustic soda and sodium carbonate to adjust its pH to 10.6, following which it was allowed to stand still to settle a precipitate. This was followed by carrying out a precise filtration of the supernatant brine to obtain a repurified brine the contents of whose Mg and Ca were 0.6 mg/liter and 0.9 mg/liter, respectively. When this repurified brine was submitted to electrolysis under identical conditions as in Example 1, the current efficiency for forming caustic soda was 96.8%. That is to say, while the contents of magnesium and calcium were less, there was drop in the current efficiency.

EXAMPLE 2

A column of the same type as that used in Example 1 was packed with 200 liters of a chelate resin with 10–50 mesh, which containing the iminodiacetic acid groups and styrenebutadiene copolymer as the main chain. A starting salt (potassium chloride)-saturated raw brine (KCl 340 g/liter, Mg 36 mg/liter, Ca 270 mg/liter), after adjusting its pH to 6, was flowed down through the foregoing column at a space velocity of 10 hr$^{-1}$, whereupon the contents of Mg and Ca, after purification by passing through the column, were 0.3 mg/liter and 0.5 mg/liter, respectively. When this brine was fed to a mercury method alkali salt electrolysis cell and electrolyzed at a current density of 50 A/dm$^2$ and a temperature of 71° ± 2° C., the current efficiency for forming caustic potash was 96.1%.

CONTROL 2

Caustic potash and potassium carbonate were added to the starting salt-saturated brine used in Example 2 to adjust the pH of the latter to 10.2, following which the brine was left to stand still to settle the resulting precipitate. When the supernatant liquid was then filtered, its content of Mg and Ca were 2.8 mg/liter and 8.8 mg/liter, respectively. When this liquid was submitted to electrolysis under identical conditions as in Example 2 after adjusting its pH to 7.4, the current efficiency for forming caustic potash was 93.3%. When the caustic potash used for purification is considered, the efficiency of obtaining the caustic potash corresponds to 92.0%.

EXAMPLE 3

The dechlorination of a depleted brine (NaCl 275 g/liter, pH = 2.4, temperature 80° C.) discharged from a mercury type alkali salt electrolysis cell was carried out by blowing with air, following which the pH of the brine was adjusted to 7.4 and saturated with a raw salt and thereafter passed through a packed column containing the same chelate resin as that of Example 1 under the same conditions, whereupon the contents of Mg and Ca became 1.2 mg/liter and 1.8 mg/liter, respectively, and the temperature became 74° C. When this brine was fed to the electrolytic cell and electrolyzed, the current efficiency for forming caustic soda was 97.6%, the electrolytic voltage was 4.37 volts, and the carbon dioxide content of the chlorine gas evolved was 0.4% by volume.

CONTROL 3

When the starting salt-saturated raw brine of Example 3 was purified by the conventional method consisting of precipitating with caustic soda and sodium carbonate, the contents of Mg and Ca became 2.3 mg/liter and 7.4 mg/liter, respectively, and the temperature became 68° C. When this brine, after neutralization, was electrolyzed, the current efficiency for forming caustic soda was 94.2%, the electrolytic voltage was 4.49 volts, and the carbon dioxide content of the chlorine gas evolved was 1.2% by volume.

EXAMPLE 4

A column having a diameter of 450 mm was packed with 100 liters of a chelate resin consisting of a 20 – 60 mesh N-phenylglycine-glycidyl methacrylate copolymer. When a starting salt-saturated brine (NaCl 310 g/liter, Mg 40 mg/liter, Ca 250 mg/liter) adjusted to pH = 6 was flowed down through this packed column at a space velocity of 7 hr$^{-1}$, the contents of Mg and Ca in the purified brine obtained after passage through the column became 0.9 mg/liter and 1.2 mg/liter, respectively.

When this brine was fed to a mercury method alkali salt electrolysis cell and electrolyzed at a current density of 70 A/dm$^2$ and a temperature of 75° ± 2° C., the current efficiency for forming caustic soda was 97.4%.

CONTROL 4

210 Grams of 30 - 60 mesh polyamine type granules obtained by treating AMBERITE IR-4B (a weak base anion exchange resin produced by Rohm & Haas Co.) with monochloroacetic acid were packed in a column having a diameter of 40 mm. When a starting salt-saturated raw brine (NaCl 310 g/liter, Mg 40 mg/liter, Ca 270 mg/liter) adjusted to a pH = 6.5 was flowed down through this packed column at a space velocity of 5 hr$^{-1}$, the contents of Mg and Ca in the saturated brine after passage through the column were 21 mg/liter and 165 mg/liter, respectively.

EXAMPLE 5

2.4 Kg of 1,2-cyclohexanediaminetetraacetic acid was dissolved in 75 liters of 2% caustic soda. This solution was repeatedly flowed down through a column of 400 mm diameter packed with 20 kg (about 60 liters) of a 10 - 40 mesh active carbon to cause the adsorption thereon of the solution. When a salt-saturated raw brine (Mg 52 mg/liter, Ca 250 mg/liter, Fe 0.25 mg/liter, Cr 0.035 mg/liter, V 0.007 mg/liter) adjusted to a pH = 7 was flowed down through the foregoing adsorbent carrier at a space velocity of 3.5 hr$^{-1}$, the contents of Mg, Ca, Fe, Cr and V in the purified brine obtained after passage through the column became respectively 1.0 mg/liter, 2.1 mg/liter, 0.02 mg/liter, 0.003 mg/liter and 0.002 mg/liter. When this purified brine was fed to a mercury method alkali salt electrolysis cell and electrolyzed at a current density of 70 A/dm$^2$ and a temperature of 70° ± 2° C., the current efficiency for forming caustic soda was 97.5%.

EXAMPLE 6

2.8 Kg of triethylenetetraminehexaacetic acid was dissolved in 50 liters of 3.5% caustic soda. This solution was repeatedly flowed down through a column of 400 mm diameter packed with 45 kg (about 50 liters) of a 20 - 40 mesh zeolite to cause the adsorption thereon of the solution. When a salt (potassium chloride)-saturated raw brine (KCl 330 g/liter, Mg 32 mg/liter, Ca 340 mg/liter) adjusted to a pH = 6 was flowed down through the foregoing adsorbent carrier at a space velocity of 8 hr$^{-1}$, the contents of Mg and Ca in the purified brine obtained after passage through the column became 0.9 mg/liter and 1.5 mg/liter, respectively. When this purified brine was fed to a mercury method alkali salt electrolysis cell and electrolyzed at a current density of 50 A/dm$^2$ and a temperature of 73° ± 2° C., the current efficiency for forming caustic potash was 95.5%.

EXAMPLE 7

Twelve kg of an oligomer (average molecular weight 400) of iminodiacetic acid propylene oxide was dissolved in 120 liters of an organic solvent consisting of a 1:1 toluene:xylene mixture, following which this solution was caused to be adsorbed onto 50 kg (about 180 liters) of a 20 - 40 mesh active carbon. When salt-saturated raw brine (NaCl 310 g/liter, Mg 35 mg/liter, Ca 255 mg/liter) adjusted to a pH = 6.5 was flowed down through a column of 600 mm diameter packed with the foregoing adsorbent carrier at a space velocity of 8.2 hr$^{-1}$, the contents of Mg and Ca in the purified brine obtained after passage through the column became 1.6 mg/liter and 4.5 mg/liter, respectively.

When this purified brine was fed to a mercury method alkali salt electrolysis cell and electrolyzed at a current density of 70 A/dm$^2$ and a temperature of 72° ± 2° C., the current efficiency for forming caustic soda was 97.2%.

EXAMPLE 8

A solution of 9 grams of iminodiacetic acid in 500 ml of water was caused to flow down repeatedly through 20 - 40 mesh silica gel packed in a column having an inside diameter of 40 mm to effect the adsorption of the former on the latter. When this was followed by flowing salt-saturated raw brine (NaCl 310 g/liter, Ca 210 mg/liter, Mg 23 mg/liter), after adjustment of its pH to 6, down through the foregoing carrier adsorptively supporting the iminodiacetic acid, at a space velocity of 12 hr$^{-1}$, the contents of Ca and Mg in the purified brine obtained after passage through the column became 15 mg/liter and 0.2 mg/liter, respectively.

EXAMPLES 9 - 17

The same column as that of Example 4 was used, and the purification of brine was carried out with various combinations of the chemicals and carriers. The conditions of the experiments are shown in Table 1, while the results obtained are shown in Table 2.

Table 1

| | Solid treating agent | | | | |
|---|---|---|---|---|---|
| | Organic compound used | | | Carrier | |
| Experiment No. | Name | Amount deposited (wt.percent) | Solvent used | Name | Weight (g) |
| Example 9 | Nitrilotriacetic acid | 2 | Water | Silica gel | 300 |
| Example 10 | N-Hydroxyethyliminodiacetic acid | 10 | Ethyl alcohol | " | 500 |
| Example 11 | Diethylentriamine pentaacetic acid | 5 | 1 % aq. NaOH sol. | Active carbon | 800 |
| Example 12 | Trimethylenediamine tetraacetic acid | 8 | 2 % aq. NaOH sol. | Georite | 750 |
| Example 13 | Ethyleneglycoldiethyletherdiamine tetraacetic acid | 12 | 0.5 % aq. ammonia sol. | " | 200 |
| Example 14 | β-Aminoethylphosphonic N,N-diacetic acid | 10 | 2 % aq. NaOH sol. | Active carbon | 200 |
| Example 15 | Amino-methylphosphonic N,N-diacetic acid | 15 | " | Silica gel | 200 |
| Example 16 | Iminodiacetic acid propylene oxide | 7 | Ethyl alcohol | Active carbon | 500 |
| Example 17 | Ethylene diamine tetraacetic acid | 5 | 3.5 % aq. NaOH sol. | Georite | 150 |

Table 2

| Experiment No. | Space velocity (column method) (hr$^{-1}$) | Metal to be removed | Property | Metal concentration (p.p.m.) Before treatment | After treatment |
|---|---|---|---|---|---|
| Example 9 | 7.0 | Ca | Aq. sol. saturated with NaCl | 170 | 9.0 |
|  |  | Mg |  | 32 | 1.0 |
| Example 10 | 6.5 | Ca | " | 180 | 7.0 |
|  |  | Mg |  | 21 | 1.2 |
| Example 11 | 10.0 | Ca | " | 230 | 12.0 |
|  |  | Mg |  | 25 | 2.0 |
| Example 12 | 5.0 | Ca | " | 170 | 5.2 |
|  |  | Mg |  | 51 | 1.2 |
| Example 13 | 10.4 | Ca | " | 300 | 12.0 |
|  |  | Mg |  | 43 | 2.0 |
| Example 14 | 7.2 | Ca | " | 250 | 7.5 |
|  |  | Mg |  | 31 | 1.0 |
| Example 15 | 6.0 | Ca | " | 180 | 9.5 |
|  |  | Mg |  | 25 | 1.3 |
| Example 16 | 7.0 | Ca | " | 350 | 11.0 |
|  |  | Mg |  | 36 | 1.2 |
| Example 17 | 5.0 | Ca | " | 250 | 4.2 |
|  |  | Mg |  | 45 | 1.5 |

We claim:

1. In the method of purifying raw brine used in the electrolysis of an aqueous NaCl or KCl solution by removing Mg and Ca ions from said brine, the improvement which comprises contacting said brine at a pH of 3 to 10 and at a space velocity of 2 to 20 hr$^{-1}$ with a member selected from the group consisting of the water-insoluble adsorbent solids adsorptively supporting a chelate-forming compound selected from the group consisting of the aminoacetic acids containing at least one >N—CH$_2$COOH in their molecular structure and the oligomers and alkali metal salts thereof.

2. The method of claim 1 wherein said chelate-forming compound is selected from the group consisting of iminodiacetic acid, nitrilotriacetic acid, N-hydroxyethyliminodiacetic acid, diethylenetriaminepentaacetic acid, 1,2-cyclohexanediaminetetraacetic acid, trimethylenediaminetetraacetic acid, ethylene glycol diethyletherdiaminetetraacetic acid, ethylenediaminetetraacetic acid, triethylenetetraminehexaacetic acid, beta-aminoethylphosphonic-N, N-diacetic acid, aminomethylphosphonic-N, N, diacetic acid, iminodiacetic acid propylene oxide, iminodiacetic acid propylene oxide oligomer, and the alkali metal salts of these compounds.

3. The method of claim 1 wherein said water-insoluble adsorbent solid is a solid carrier selected from the group consisting of the carbon adsorbents, silica gel, zeolite and the organic synthetic high molecular weight adsorbents.

4. The method of claim 1 which comprises dechlorinating NaCl or KCl containing brine discharged from an alkali salt electrolysis cell, adding raw alkali salt to the resulting dechlorinated brine in an amount up to saturation, and thereafter contacting the solution with a member selected from the group consisting of the water-insoluble adsorbed solids adsorptively supporting a chelate-forming compound selected from the group consisting of the aminoacetic acids containing at least one >N—CH$_2$COOH in their molecular structure and the oligomers and alkali metal salts thereof.

5. A method for the electrolysis of aqueous NaCl or KCl brine solution for the production of chlorine which comprises passing the brine solution through an electrolytic cell, passing an electric current through the cell and brine solution, passing the depleted brine solution to a dechlorination step to remove chlorine therefrom, adjusting the pH of the depleted brine solution to 3 to 10, saturating the depleted brine solution with raw salt containing Mg and Ca, filtering the saturated brine solution to remove undissolved solids, flowing the filtered brine solution at a pH of 3 to 10 and a space velocity of 2 to 20 hr$^{-1}$ through a bed containing a member selected from the group consisting of solid granular water-insoluble adsorbent solids adsorptively supporting a chelate-forming compound selected from the group consisting of the aminoacetic acids containing at least one >N—CH$_2$COOH in their molecular structure and the oligomers and the alkali metal salts thereof to selectively remove and substantially reduce the Mg and Ca concentration and recycling the saturated brine solution reduced in Mg and Ca to the electrolytic cell.

6. The method of claim 5 wherein said water-insoluble adsorbent solid is a solid carrier selected from the group consisting of the carbon adsorbents, silica gel, zeolite and the organic synthetic high molecular weight adsorbents.

7. The method of claim 5 wherein said chelate-forming compound is selected from the group consisting of iminodiacetic acid, nitrilotriacetic acid, N-hydroxyethyliminodiacetic acid, diethylenetriaminepentaacetic acid, 1, 2-cyclohexanediaminetetraacetic acid, trimethylenediaminetetraacetic acid, ethylenediaminetetraacetic acid, triethylenetetraminehexaacetic acid, beta-aminoethylphosphonic-N, N-diacetic acid, aminomethylphosphonic-N, N, diacetic acid, iminodiacetic acid propylene oxide, iminodiacetic acid propylene oxide oligomer, and the alkali metal salts of these compounds.

8. The process of claim 5 wherein said water-insoluble adsorbent solids contain about 2 to 20% by weight of said chelate-forming compound.